United States Patent
Jackson et al.

(10) Patent No.: US 10,441,876 B2
(45) Date of Patent: Oct. 15, 2019

(54) VIDEO GAME INTEGRATING RECORDED VIDEO

(71) Applicants: Jamie Jackson, Santa, CA (US); Joel Davey, Santa Monica, CA (US)

(72) Inventors: Jamie Jackson, Santa, CA (US); Joel Davey, Santa Monica, CA (US)

(73) Assignee: Activision Publishing, Inc., Santa Monica, CA (US)

(*) Notice: Subject to any disclaimer, the term of this patent is extended or adjusted under 35 U.S.C. 154(b) by 1039 days.

(21) Appl. No.: 14/136,303

(22) Filed: Dec. 20, 2013

(65) Prior Publication Data

US 2015/0174477 A1    Jun. 25, 2015

(51) Int. Cl.
| | | |
|---|---|---|
| A63F 13/00 | (2014.01) | |
| A63F 13/213 | (2014.01) | |
| A63F 13/814 | (2014.01) | |
| A63F 13/245 | (2014.01) | |
| A63F 13/65 | (2014.01) | |

(52) U.S. Cl.
CPC .......... *A63F 13/213* (2014.09); *A63F 13/245* (2014.09); *A63F 13/65* (2014.09); *A63F 13/814* (2014.09)

(58) Field of Classification Search
None
See application file for complete search history.

(56) References Cited

U.S. PATENT DOCUMENTS

| | | | | |
|---|---|---|---|---|
| 5,850,352 A * | 12/1998 | Moezzi | ................ | H04N 13/139 345/419 |
| 6,234,901 B1 * | 5/2001 | Nagoshi | .................. | A63F 13/10 345/426 |
| 6,697,071 B2 * | 2/2004 | Iino | ......................... | G06T 13/40 345/473 |
| 7,071,914 B1 * | 7/2006 | Marks | ..................... | G06F 3/017 345/156 |
| 7,320,643 B1 * | 1/2008 | Brosius | .................... | A63F 13/06 463/37 |
| 7,542,553 B2 * | 6/2009 | Gurfein | ................. | H04M 3/493 379/88.04 |
| 7,797,146 B2 * | 9/2010 | Harless | .................. | G10L 15/26 345/473 |
| 8,721,441 B1 * | 5/2014 | Chen | ..................... | A63F 13/814 463/35 |
| 9,919,219 B2 * | 3/2018 | Jackson | ................. | A63F 13/792 |
| 2002/0022515 A1 * | 2/2002 | Boku | ...................... | A63F 13/10 463/31 |
| 2002/0065121 A1 * | 5/2002 | Fukunaga | ............... | A63F 13/08 463/8 |
| 2006/0009979 A1 * | 1/2006 | McHale | .................. | A63F 13/10 704/270 |
| 2007/0060349 A1 * | 3/2007 | Fish | ........................ | G07F 17/34 463/31 |
| 2007/0163427 A1 * | 7/2007 | Rigopulos | ............... | A63F 13/00 84/609 |

(Continued)

*Primary Examiner* — Paul A D'Agostino
(74) *Attorney, Agent, or Firm* — Klein, O'Neill & Singh, LLP

(57) ABSTRACT

Aspects of the present invention relates to systems and methods of conducting video game play, comprising: displaying a game scene, the game scene including recorded video portions and graphically rendered portions; the recorded video portions comprising a first recorded video track; determining user performance; and, based on the determined user performance, transitioning the first recorded video track to a second recorded video track.

11 Claims, 10 Drawing Sheets

(56) References Cited

U.S. PATENT DOCUMENTS

| | | | |
|---|---|---|---|
| 2008/0094358 A1* | 4/2008 | Sullivan | G06F 3/04815 345/161 |
| 2008/0113797 A1* | 5/2008 | Egozy | A63F 13/12 463/35 |
| 2008/0311969 A1* | 12/2008 | Kay | A63F 13/10 463/7 |
| 2009/0075721 A1* | 3/2009 | Pacey | G07F 17/34 463/20 |
| 2009/0209308 A1* | 8/2009 | Ciarrocchi | A63F 13/08 463/1 |
| 2009/0258705 A1* | 10/2009 | Guinchard | A63F 13/02 463/37 |
| 2010/0029386 A1* | 2/2010 | Pitsch | A63F 13/12 463/35 |
| 2010/0197395 A1* | 8/2010 | Geiss | A63F 13/10 463/31 |
| 2010/0248832 A1* | 9/2010 | Esaki | A63F 13/06 463/36 |
| 2010/0255903 A1* | 10/2010 | Bala | A63F 13/12 463/30 |
| 2011/0003638 A1* | 1/2011 | Lee | G09B 15/00 463/35 |
| 2011/0009191 A1* | 1/2011 | Naidenov | A63F 13/10 463/35 |
| 2011/0045907 A1* | 2/2011 | Villa | A63F 13/00 463/37 |
| 2011/0093820 A1* | 4/2011 | Zhang | A63F 13/06 715/863 |
| 2011/0256929 A1* | 10/2011 | Dubrofsky | A63F 13/10 463/37 |
| 2012/0004018 A1* | 1/2012 | Reeves | G07F 17/3288 463/4 |
| 2015/0080072 A1* | 3/2015 | Kim | A63F 13/213 463/7 |
| 2015/0133215 A1* | 5/2015 | Heinz, II | A63F 13/355 463/31 |
| 2015/0174477 A1* | 6/2015 | Jackson | A63F 13/814 463/31 |

* cited by examiner

VIDEO GAME INTEGRATING RECORDED VIDEO

BACKGROUND

The present invention relates to the integration of prerecorded video into video games.

Video games provide fun and enjoyment for many. Video games allow users to participate in a variety of simulated activities, including those that the users may not be able or desire to experience directly. Video games receive interactive inputs from users and may produce vibrant visual displays with accompanying audio.

Typically, video game characters, scenes, and objects are generated using 2D and/or 3D graphics rendering techniques involving, for example, sprites, vectors, and/or 3D models. Recorded video, including pre-recorded live-action video clips or pre-rendered animation sequences, generally have not been prominently used in most video games, except in two limited circumstances.

First, recorded video has been used for game-related cut-scenes and cinematic sequences. These cut-scenes and cinematic sequences are typically used outside of a video game's actual gameplay and mainly serve to advance the video game's plotlines. Second, recorded video has been used in video games that are sometimes referred to as interactive movies or full-motion video games. These games consist of videos depicting varying plotline branches for a main story. The videos are typically stored on optical media such as CD-ROMs, DVD-ROMs, and Laserdiscs and played in conventional media players. During playback of the videos, a user is prompted to make certain selections at predetermined times in the playback. The selections are then used to alter the playback sequence of the various plotline branches.

These limited attempts at integrating recorded video into video games suffered from various drawbacks, including the lack of immersive interactivity with the recorded video. Cut-scenes and cinematic sequences typically were separate from actual gameplay, and the user had little or no control during their playback. In addition, choosing a path at a branch-point in an interactive movie—which typically resulted in the playback of one of only a very small number of plotline branches offered very restrictive gameplay when compared to the freedom of choices and actions given a user in traditionally-rendered video games.

Another problem with previous attempts at integrating recorded video into video games was the recorded video's lack of dynamic response. While various plotline branches could be played based on user selection, the video played in response to a particular sequence of user selections was static. The recorded video did not dynamically react to gameplay events and user performance.

BRIEF SUMMARY OF THE INVENTION

The invention provides methods and systems for integrating recorded video into video games.

In one aspect, the invention provides a method of conducting video game play, comprising: displaying a game scene, the game scene including recorded video portions and graphically rendered portions; the recorded video portions comprising a first recorded video track; determining user performance; and, based on the determined user performance, transitioning the first recorded video track to a second recorded video track.

In another aspect, the invention provides a method of conducting a music-based video game, comprising: displaying a game scene, the game scene including recorded video portions and graphically rendered portions; the recorded video portions comprising a first recorded video track; determining a game play event; and based on the determined game play event, transitioning the first recorded video track to a second recorded video track.

These and other aspects of the invention are more fully comprehended upon review of this disclosure.

DETAILED DESCRIPTION

Aspects of the present invention relate generally to the integration of recorded video into video games. The integration of recorded video into video games can be applied to various genres of video games to offer more realistic and immersive gameplay. For example, in a music or rhythm based video game, depicting the audience, band members, and other aspects of the scene using recorded video from a first-person viewpoint can help give the game player a sense that he is performing in front of a live audience. Similarly, in a sports video game, depicting team members, opponents, coaches, spectators, and other aspects of the scene using recorded video helps give the game player a sense that he is actually competing in a live sporting event. These and other details relating to the use of recorded videogames are discussed in more detail herein.

Figure 1A:
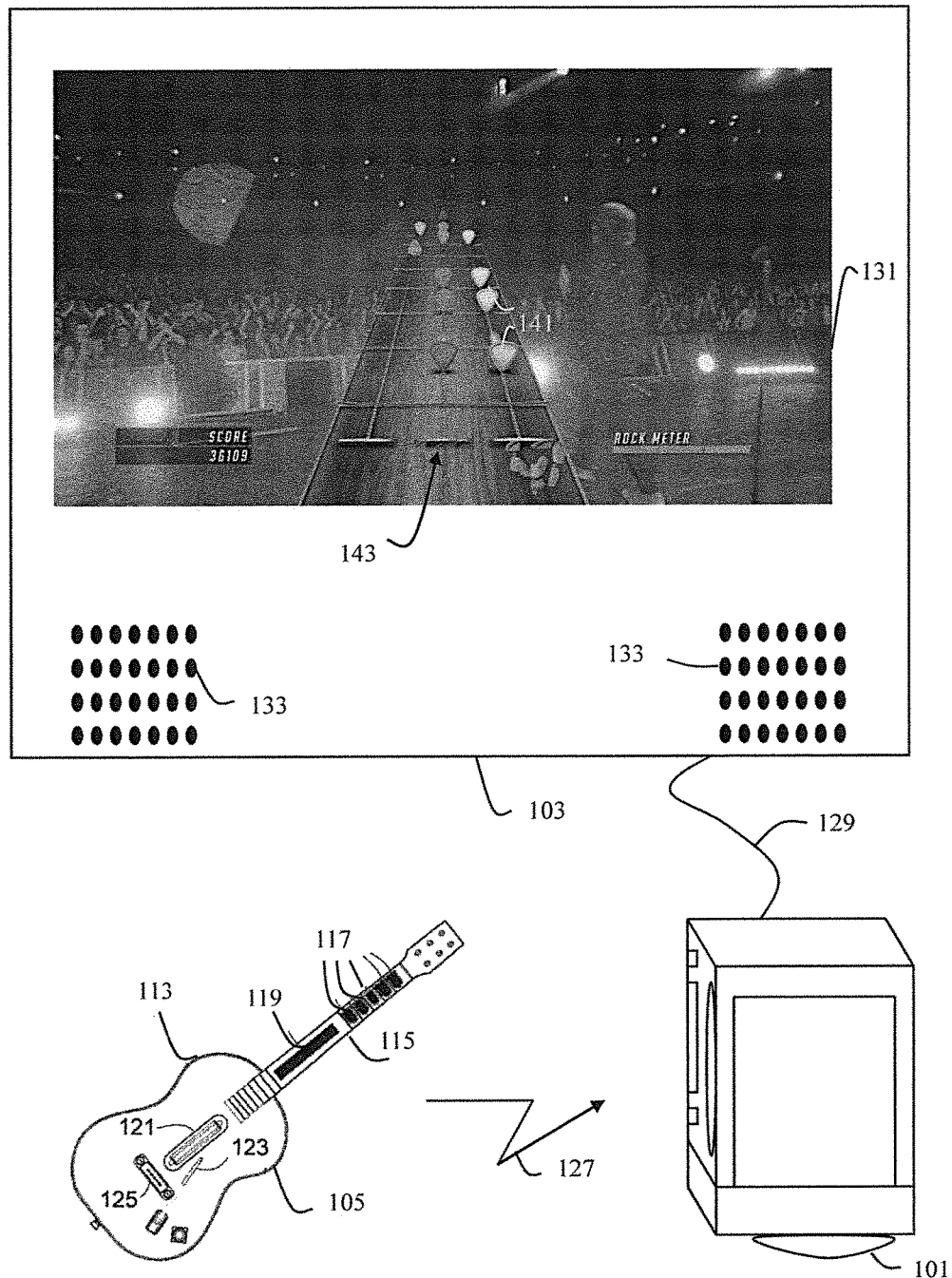
FIG. 1A illustrates an example of a video game system in accordance with aspects of the invention.
Figure 1B:
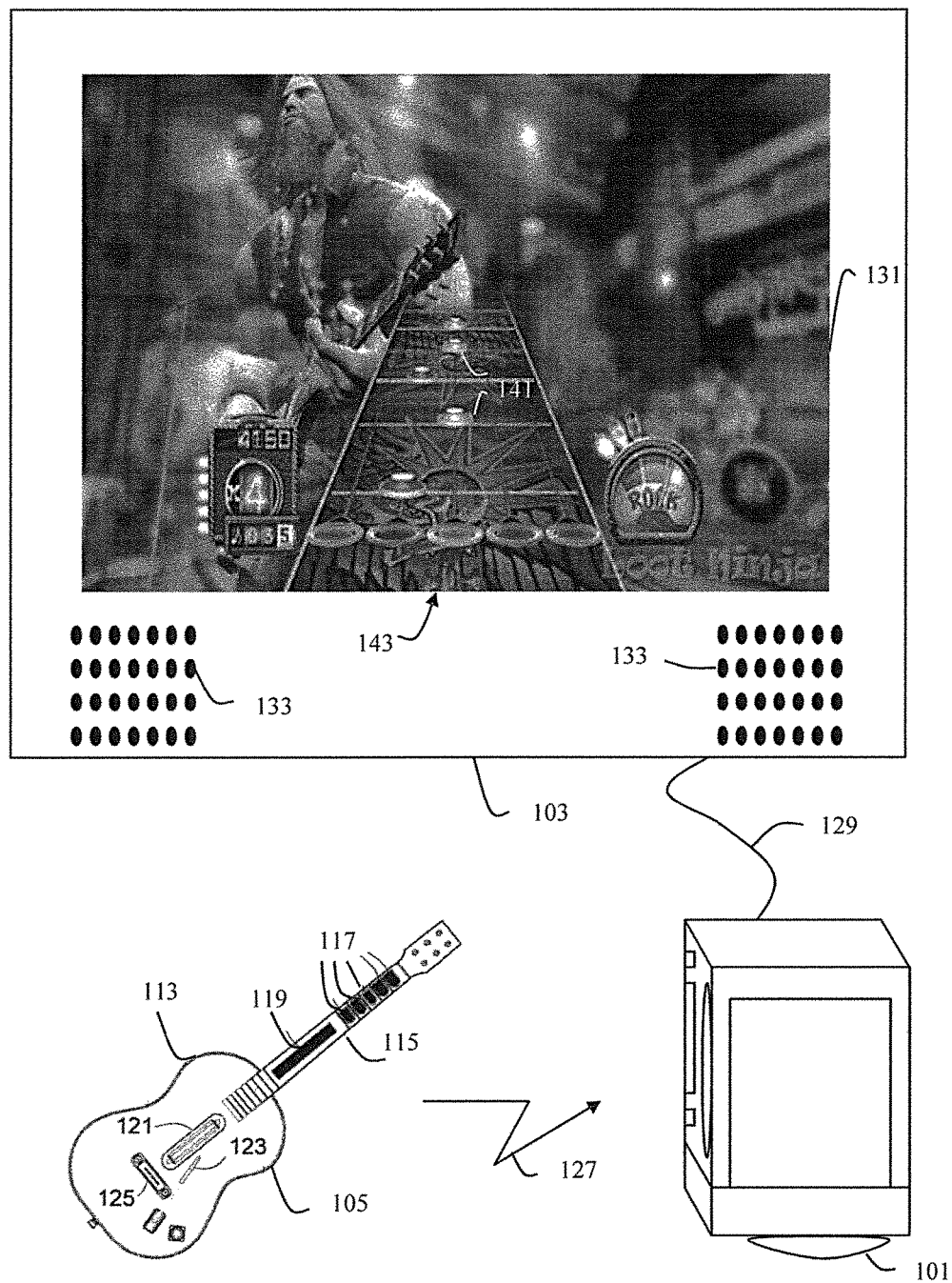
FIG. 1B illustrates an example of a video game system in accordance with aspects of the invention.

FIGS. 1A and 1B are examples of video game systems in accordance with aspects of the invention. To the extent elements of FIGS. 1A and 1B share the same numbering, discussion relating to those elements applies to both figures.

The video game system of FIG. 1A includes a video game console 101, a display 103, and a controller 105. The video game console includes internal circuitry that allows the console to run a video game by executing various program instructions related to proper execution of the video game. The video game console typically includes one or more processors, memory, and various interface circuitries.

The instructions providing for game play are generally stored on removable media, for example, an optical disk. Accordingly, the game console may include an optical drive, for example, a DVD-ROM, CD-ROM, Blu-ray drive, or similar device, for reading the instructions for game play. In some embodiments, the removable media may be a flash memory data storage device. In other embodiments, the instructions providing for game play may be stored in a remote server that is accessed over one or more networks. In yet other embodiments, the instructions providing for game play may be stored on the local memory of the video game console.

As used herein, "video game console" broadly encompasses various computing devices suitable for playing video games. In some embodiments, the video game console may be a traditional video game console such as a Microsoft Xbox, Sony Playstation, Nintendo Wii, or similar. In other embodiments, the video game console may be a personal computer running any of a variety of known operating systems (e.g., Microsoft Windows, Mac OS, UNIX, Linux, etc.). In some embodiments, the video game console may be a handheld or portable device capable of playing video games, such as a mobile PC, laptop, tablet, mobile gaming device, smart phone, or mobile phone. The handheld or portable device may include similar or identical internal circuitry as herein described, as well as, for example, one or more displays, which may be a built-in display or a projected display, and various different user input controllers.

The video game console of FIG. 1A is coupled to the controller by a wireless connection 127. In many embodiments, the controller and video game console may be coupled by a wired connection. In addition, the controller illustrated in FIG. 1A is in the shape of a guitar. In various embodiments, other controllers may instead or additionally be used, including generic controllers, microphones, drums, drumsticks, keyboards, DJ turntables, dance pads or mats, other guitar-shaped controllers, or controllers in the general form of other musical instruments.

Figure 1C:
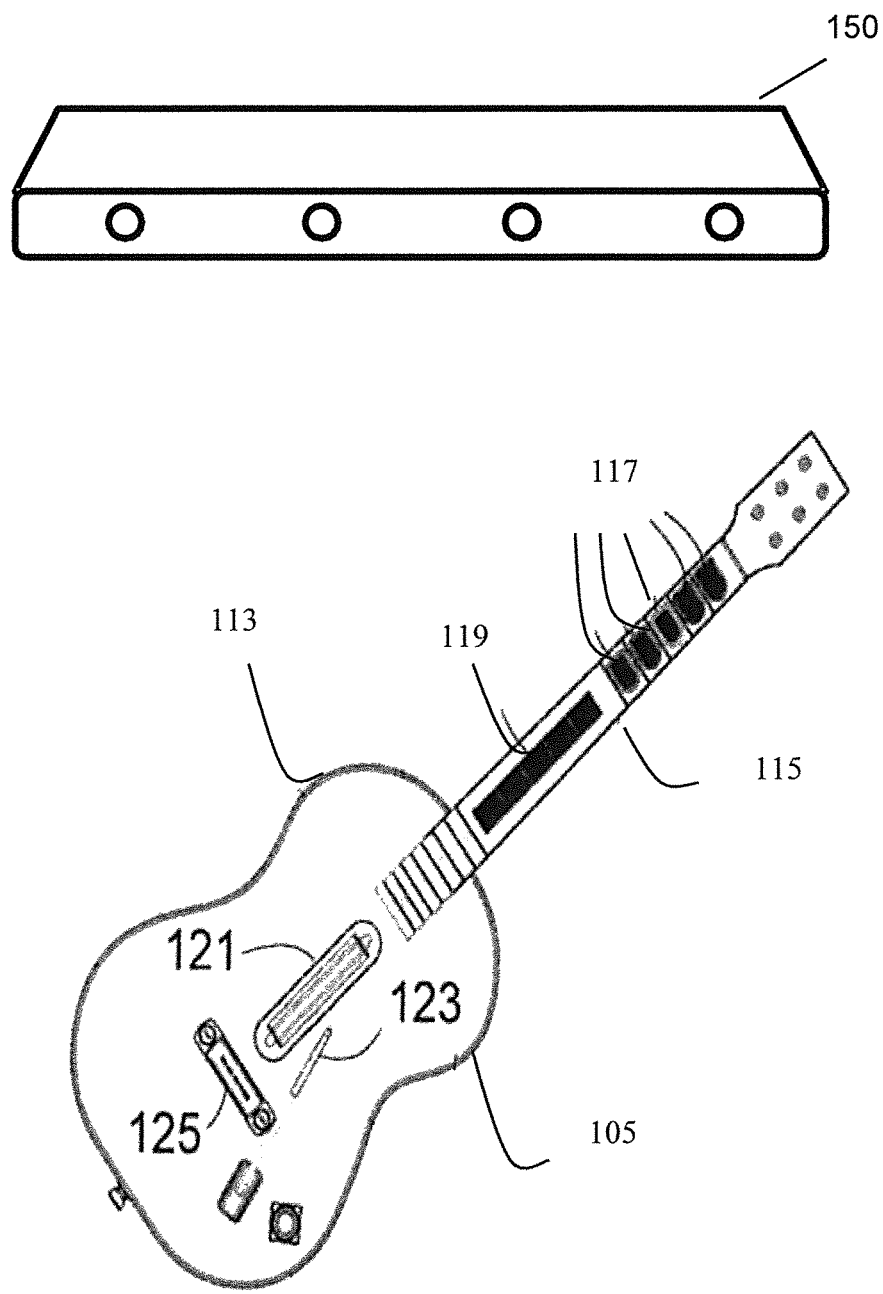
FIG. 1C illustrates an example of an input controller in accordance with aspects of the invention.

FIG. 1C illustrates an example of a guitar-shaped controller 105 in accordance with aspects of the present invention. In some embodiments, the controller 105 comprises a body 113 and neck 115. Controller 105 may further comprise various input buttons that permit the user to interact with the video game console, such as strum bar 121, whammy bar 123, fret buttons 117, neck input 119, and controller buttons 125.

In some embodiments, controller 105 comprises one or more motion sensing devices, which determine the motion of the controller and/or user, and allow the user to interact with the video game console using physical movements. Motion sensing devices may include, for example, one or more gyroscopes, accelerometers, altimeters, geomagnetic sensors, magnetometers, optical or infrared projectors and transceivers, depth-sensing cameras, global positioning systems, thermal imaging systems, or any other similar device that generates signals provided to the video game console from which the video game console can determine motion of the controller and/or user. In some embodiments, the motion sensing device may be worn by the user. As used herein, the term "motion" is used broadly to encompass motion, position, posture, orientation, and location. Examples of systems incorporating exemplary motion sensing devices include the Nintendo Wii and Wii U, Sony PlayStation Move, and Microsoft Kinect platforms. In the embodiment illustrated in FIG. 1C, controller 105 may include, for example, one or more gyroscopes, accelerometers, and magnetometers (not shown). Controller 105 of FIG. 1C also includes a depth-sensing camera 150. Depth-sensing camera 150 may be used, for example, to detect the motion information relating to controller 105 and/or one or more users.

Figure 1D:
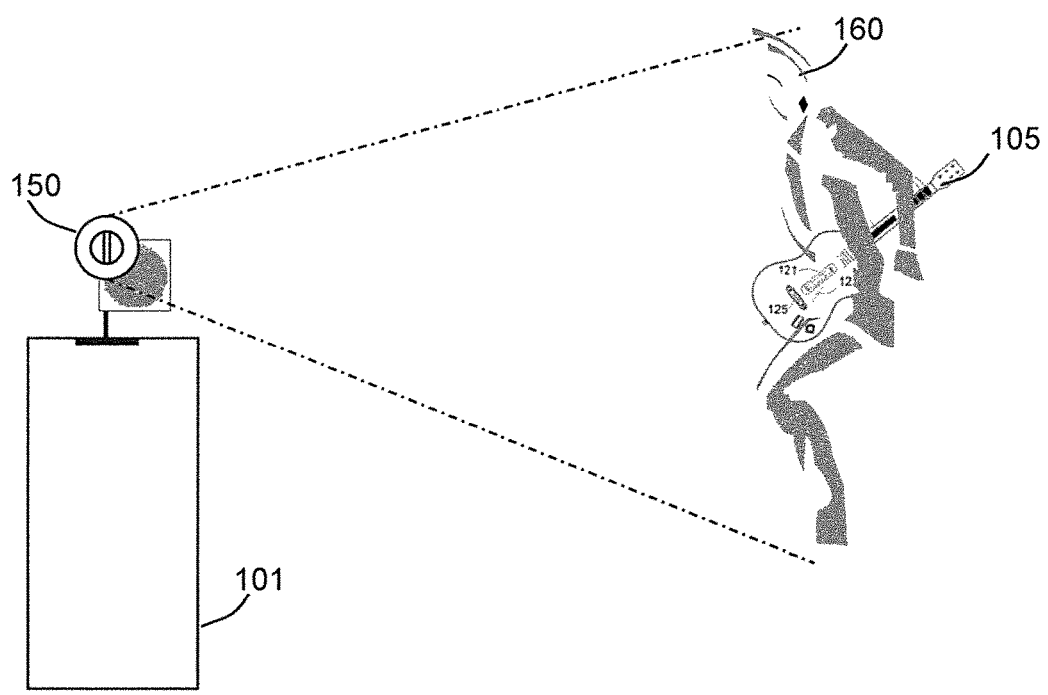
FIG. 1D illustrates an example motion determination system using a camera in accordance with aspects of the invention.

FIG. 1D shows a further configuration for providing a video game console with motion related signals. The configuration of FIG. 1D includes a video game console 101. An imaging device 150 is coupled to the video game console. In various embodiments, the imaging device is a visible light imaging device, for example a web camera, an infrared imaging device, a thermal imaging device, depth-sensing camera, or some combination of those devices. A user 160 is within the field of view of the imaging device, and the user is holding a controller 105. The controller 105, as illustrated, is in the shape of a guitar, although in various embodiments other controllers may be used.

In the embodiment of FIG. 1D, the video game console includes image analysis program instructions, which may be provided by way of program instructions on a removable media such as a CD-ROM on which program instructions for a video game are provided. The image analysis program may determine position of the controller and/or the user. In some embodiments, the controller and/or the user may be provided light, thermal, or infrared emitting devices, reflective items, or other devices to increase ease of processing of the image analysis program.

Again referencing FIG. 1A, the video game console is also in communication with a display unit 103, generally through an audio-video cable or similar wired connection, although a wireless connection may be used in some embodiments. Display unit 103 is generally some television or monitor. In many embodiments, the display unit 103 is a liquid crystal display (LCD), light-emitting diode (LED) display, or some other flat-panel display. In some embodiments, the display unit 103 is integrated with the video game console. The display unit generally comprises a display screen 131 and at least one audio output device, such as a speaker 133. In the embodiment of FIG. 1A, the display screen shows a screen shot of video game play in a music-based video game.

As illustrated in FIG. 1A, the display shows a screenshot of an exemplary music-based video game in accordance with aspects of the present invention. Although various aspects of the invention are described in the context of a music-based video game, one of ordinary skill in the art will appreciate that many of the teachings of this invention apply equally to other video game genres. In the particular screenshot of FIG. 1A, the display includes a plurality of instructive cues 141. The instructive cues generally scroll across portions of the screen towards and into a predefined area of the screen, such as the NOW area 143. Although the screenshot of FIG. 1A shows the instructive cues scrolling in a substantially vertical direction, the instructive cues may scroll in any direction or along an arbitrary path. The display also shows a game scene, in this case a music concert scene, viewed from the viewpoint of an in-game performer representative of the game player. The music concert scene may be considered a scene of a music concert game world, with the game world including a crowd of people providing an audience for a musical performance. The viewpoint of the in-game performer may be considered a point of view in the game world, to be used in determining the game scene to be displayed (i.e., a first-person viewpoint). In some embodiments, and as shown in the FIG. 1B, the display may show one or more video game characters as in-game performers representative of one or more game players (i.e., a third-person viewpoint).

During video game play, a user is to depress or have depressed various buttons and/or utilize a strum bar or other user manipulable input device of the controller responsive to the instructive cues, generally when the instructive cues reach a predefined area of the display such as the NOW area 143. In most embodiments, the video game console evaluates the user's performance based on the extent of the user's compliance with the operations commanded by the instructive cues. In addition, the video game console generally commands presentation of audio during video game play. In most embodiments, audio of a musical selection is provided if the user complies with the instructive cues, and silence, which in some embodiments may be a lack of audio of part of the musical selection, or a sound associated with a missed note may be provided if the user does not comply with the instructive cues. Whether silence or a sound associated with a missed note is provided may depend, for example, on whether the user operates incorrect input commands or does not operate any input device. In various embodiments the presentation of audio may also include audio from a crowd of the game world, with for example the crowd being an audience for a musical performance.

Figure 2:
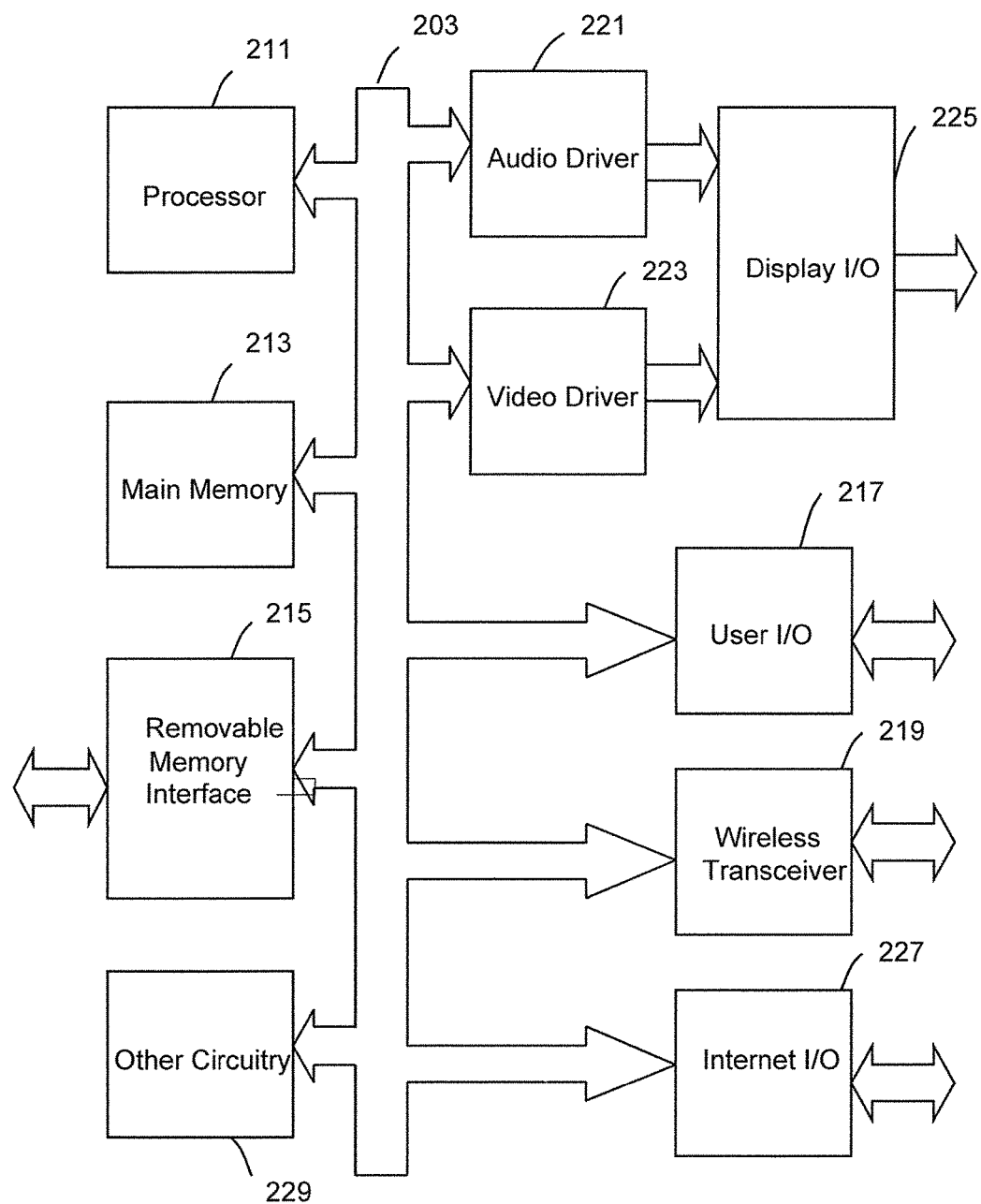
FIG. 2 is a block diagram of a video game console in accordance with aspects of the invention.

FIG. 2 is an example of a block diagram of a video game console in accordance with aspects of the invention. In the embodiment of FIG. 2, the video game console includes at least one processor 211 interconnected with other components via a system bus 203. The other components may include, for example, a main memory 213 of the video game console, a removable memory interface 215, a user input/output port 217, a wireless transceiver 219, an audio driver 221, a video driver 223, an Internet input/output port 227, a display input/output port 225, and other circuitry 229, which may include for example an infrared sensor. In other embodiments of the invention, there may be different combinations of components that make up a video game console, depending on the individual needs of each application.

The processor executes program instructions to provide video game play, for example the music-based video game described with respect to FIG. 1A or 1B. The processor may obtain program instructions from a removable memory source, for example, a video game CD-ROM, inserted into the removable memory interface of the video game console. The processor also receives user input signals from a motion sensing device and/or a connected video game controller or microphone, through the user input/output port, the wireless transceiver, and/or other circuitry. The processor processes the program instructions and receives input signals to generate audio and video output signals representative of video game play.

The processor may also be in data communication with a display unit, generally combined with one or more speakers, which presents video game action to a user of the system. The processor may send audio generation information to the audio driver, and video generation information to the video driver, each of which generates audio and video output signals, respectively, from the received generation information. The audio and video drivers forward the audio and video output signals through a combined display input/output port 225, or alternatively, separate audio and video input/output ports, to the display unit.

In some embodiments, the processor is also connected to the Internet via either the Internet input/output port or via the wireless transceiver. A connection to the Internet may be used to facilitate multiplayer game play with other users in remote locations in a multiplayer option. In some embodiments, an Internet connection may also be used by video game publishers to offer, for free or for sale, downloadable content associated with a particular game. In a music-based video game, downloadable content may include, for example, new songs, background audio tracks or other content.

Figure 3:
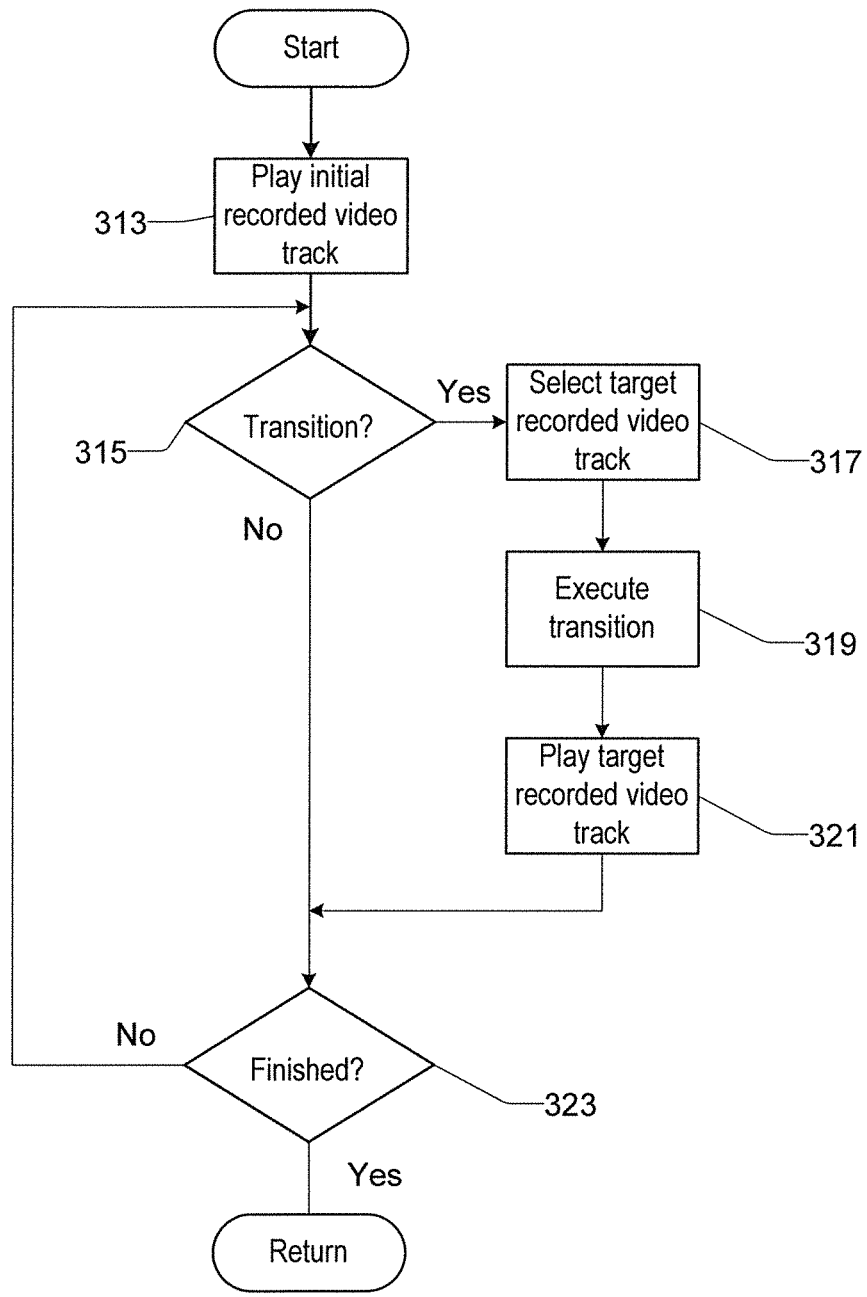
FIG. 3 is a flowchart of a process for a video game in accordance with aspects of the invention.

FIG. 3 is a flowchart of a process for integrating recorded video into a game scene in accordance with aspects of the invention. As used herein, the term "recorded video" includes various pre-recorded audio/video segments that are played back to provide audio-video elements for display and sound reproduction, including, for example, pre-recorded live-action video clips, television- or movie-quality recordings, pre-rendered animation sequences, pre-rendered photorealistic videos, etc. In some embodiments the recorded video is recorded in a plurality of different video tracks. For example, in one embodiment two different video tracks may be recorded, and recorded at different times; a first with a crowd showing enjoyment and appreciation of a good musical performance, and a second with a crowd showing displeasure at a poor musical performance. In some embodiments the band, or some members of the band, may instead or in addition be recorded showing such emotions and actions. Use of responses by other band members to quality of musical performances may be particularly useful in providing a more immersive experience, considering the other band members are likely to be both represented as physically closer and presumably more musically knowledgeable than crowd members. In some embodiments four different video tracks may be recorded, two video tracks as indicated above for the crowd, and two video tracks as indicate above for the band. In some embodiments the video is recorded for the different tracks from common camera positions and angles throughout a course of a song, with the common camera positions and angles commonly changing in time throughout the course of the song in some embodiments. The common camera positions and angles may be obtained using a moveable robotic camera, for example under computer control, for example. In such embodiments, actors portraying the crowd and/or band may retain the same positions, and in some embodiments the same general body posture, at common times during recording of the different tracks. For example, at a time one minute and 7 seconds into a song, each of the members of the audience, or some subset of the members of the audience, for example those nearest to a stage, may have positions that are the same for recording both a "good performance" track and a "bad" performance track. In addition, in some embodiments more than two different video tracks may be recorded. For example, there may be a plurality of different "good performance" and/or "bad" tracks recorded, with in some embodiments each track showing a crowd exhibiting different levels of enthusiasm for a musical performance.

In some embodiments, the process for integrating recorded video into a game scene is performed by the video game console of FIGS. 1A and 1B, or a processor of the video game console, for example, as discussed with respect to FIG. 2. Program instructions for the process may be stored on an optical disc or another computer-readable medium.

In block 313, the process begins by selecting an initial recorded video track for playing in a game scene. In some embodiments, the game scene may comprise recorded video portions and graphically rendered portions. In such embodiments, the recorded video track may account for only a portion of the entire game scene, with rendered graphics forming the remaining portions of the game scene. For example, in the context of a music-based video game, the recorded video track may depict aspects of the crowd, audience, and/or band members, while the concert arena, lighting effects, and other in-game objects are rendered using traditional graphics rendering techniques. In some embodiments, the recorded video track may be looped such that it is replayed upon completion.

In block 315, the process determines whether a request has been made to transition the current recorded video track to a different recorded video track or "target" recorded video track. In some embodiments, and as discussed in more detail below, the determination may be based on, for example, user performance, user input, or other gameplay events. If a transition is requested, the process proceeds to block 317. Otherwise, the process proceeds to block 323.

In block 317, the process executes the transition. In some embodiments, the transition may comprise flashing a screen effect, such as a lens flare, to hide the transitioning of the video tracks. In some embodiments, the transition may comprise morphing the playing recorded video track into the target video track. In some embodiments, the process analyzes the playing video track and target video track and dynamically determines the transition to execute. In some embodiments, transitions are predefined for transitions between particular recorded video tracks. In some embodiments a blur effect is provided during a transition between first and second recorded video tracks. The use of blurring during transitions may be beneficial for many reasons, including for example to avoid the presence of visual discontinuities between postures of crowd members or band members in the different video tracks. For example a blur period may occur during transitions, and the blur period may last for between 0.3 and 1 seconds, with display of one or both of the first and second recorded video tracks blurred during the blur period. In some embodiments a sudden point of view change may be provided during transitions. For example, in one embodiment the point of view may suddenly change from a view of the crowd to a view of other band members during a transition. In some embodiments the sudden point of view change may occur only briefly, with for example the point of view changing during the transition to a different section of the crowd, or towards the sky, or towards a stage floor, and then returning to the prior point of view. In some embodiments, the playing recorded video track may fade away while the target video track fades in. Any number of transitions may be used, including cuts, mixes, dissolves, wipes, or transitions involving digital effects. After executing the transition, the process proceeds to block 319.

In block 319, block the process plays the target recorded video track and proceeds to block 323. In block 323, the process determines if the process is finished. The process may finish, for example, when the end of game play is reached or based on user input. If the process is finished, the process returns; otherwise, the process returns to block 315.

Figure 4:
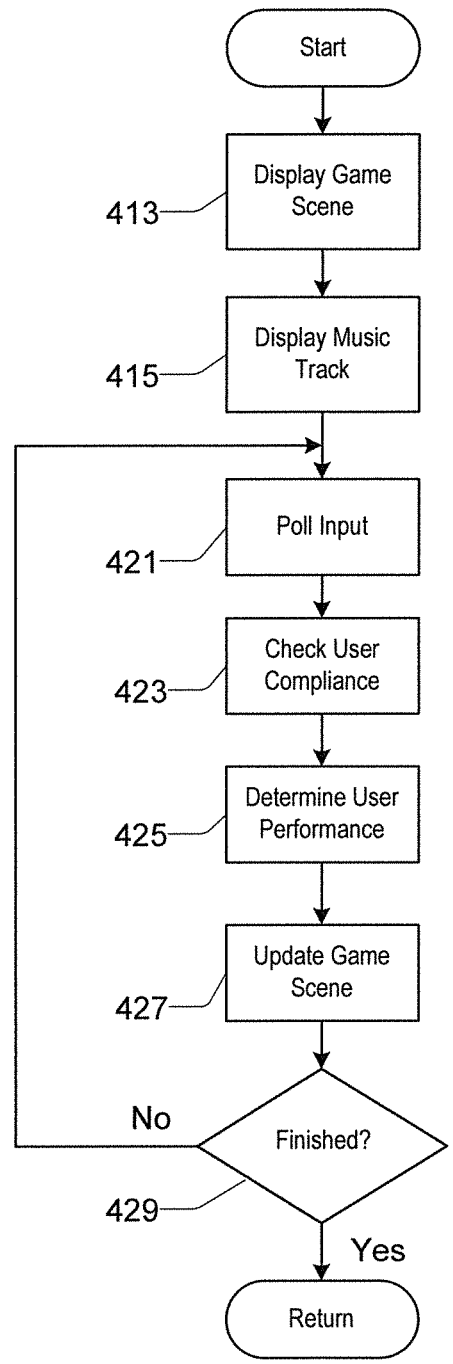
FIG. 4 is flowchart of another process for a video game in accordance with aspects of the invention.

In accordance with aspects of the invention, FIG. 4 is a flowchart of a process for updating a game scene in a music-based video game in response to user performance. In some embodiments, the process is performed by the video game console of FIGS. 1A and 1B, or a processor of the video game console, for example, as discussed with respect to FIG. 2. Program instructions for the process may be stored on an optical disc or another computer-readable medium. Although the process is described in the context of a music-based video game, one of ordinary skill will recognize that the teachings of the process may be applied to other video game genres in which recorded video may be used to increase realism and immersion, including for example, sports games, first-person shooters, action adventure games, real-time strategy games, etc.

In block 413, the process displays a game scene. As discussed in connection with the process of FIG. 3, the game scene may comprise recorded video portions and graphically rendered portions.

In block 415, the process displays a music track. The music track includes gems to provide a user with instructions of actions to perform on a controller such as, for example, a guitar controller. Expected user actions may be based on the colors, shapes, and positions of the gems. In one embodiment, the gems initially appear in an upper portion of a display screen and move generally toward a lower portion of the display screen. A horizontal NOW bar is displayed in the lower portion of the display screen with many user actions instructed to be performed when gems reach the NOW bar. The process also produces game sounds to accompany the music track. In many embodiments, the music track is rendered partially transparent so that the portions of the game scene underlying the music track can still be perceived. The partial transparency may be accomplished by, for example, alpha blending the music track with the underlying game scene. Accordingly, the music track may include an alpha channel indicating the relative display intensities of the music track and the game scene.

In block 421, the process polls for input from the user. Input from the user may be received from the controller of FIGS. 1A-1D. Inputs from the user are commonly signaled electrically although the type of physical action taken by the user varies with the particular type of game. For example, the user may provide inputs by performing a strumming action on a guitar controller.

In block 423, the process checks for user compliance with the instructions contained in the music track. For example, when certain gems or combinations of gems reach the NOW bar, a corresponding user manipulation of the controller is considered correct. Often, user compliance is based on the specific user manipulation of the controller and the timing of the user's actions.

In block 425, the process determines the user's performance. In many embodiments, the user's performance depends at least in part on the user's compliance with music track instructions, as described in block 423. For example, the user's performance may be a function of the number of consecutive instructions the user has complied with. Alternatively or additionally, the user's performance may be a function of the ratio of correctly executed instructions to incorrectly executed instructions. In some embodiments, the user's performance may also depend on user input not directly related to the music track instructions. For example, the user's performance may depend on the user's body movements, including jumping or clapping his hands to the beat of the song. In some embodiments, the user's performance may be categorized using predefined rankings, such as "poor," "good," and "excellent."

Figure 6A:
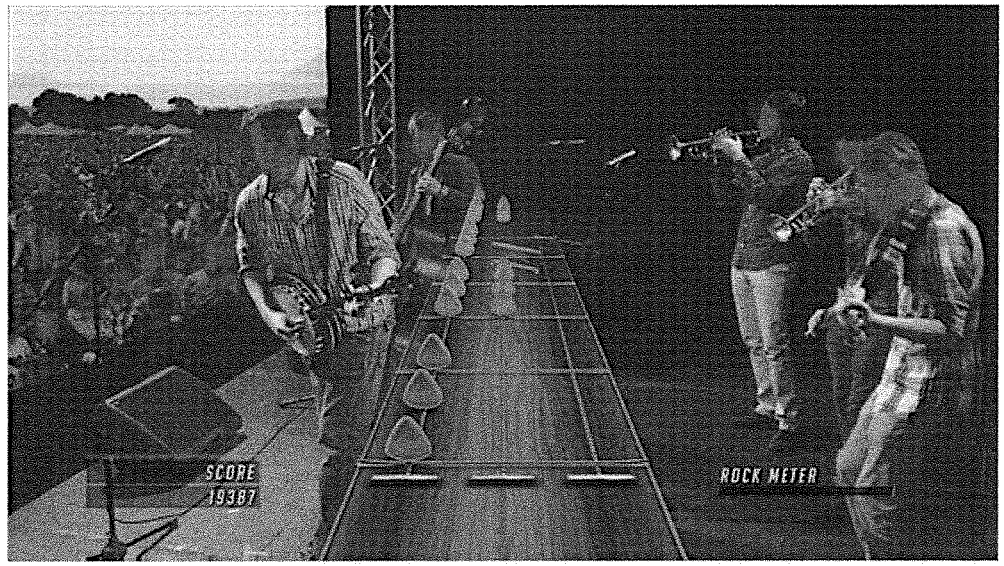
FIGS. 6A and 6B illustrate game scenes from a video game in accordance with aspects of the invention.
Figure 6B:
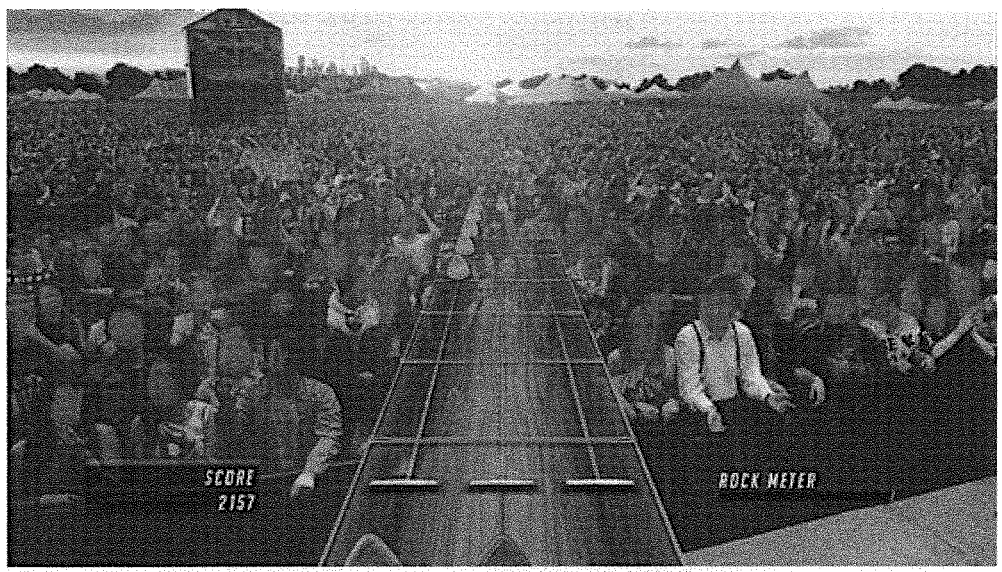
Figure 7A:
FIGS. 7A and 7B illustrate additional game scenes from a video game in accordance with aspects of the invention.
Figure 7B:
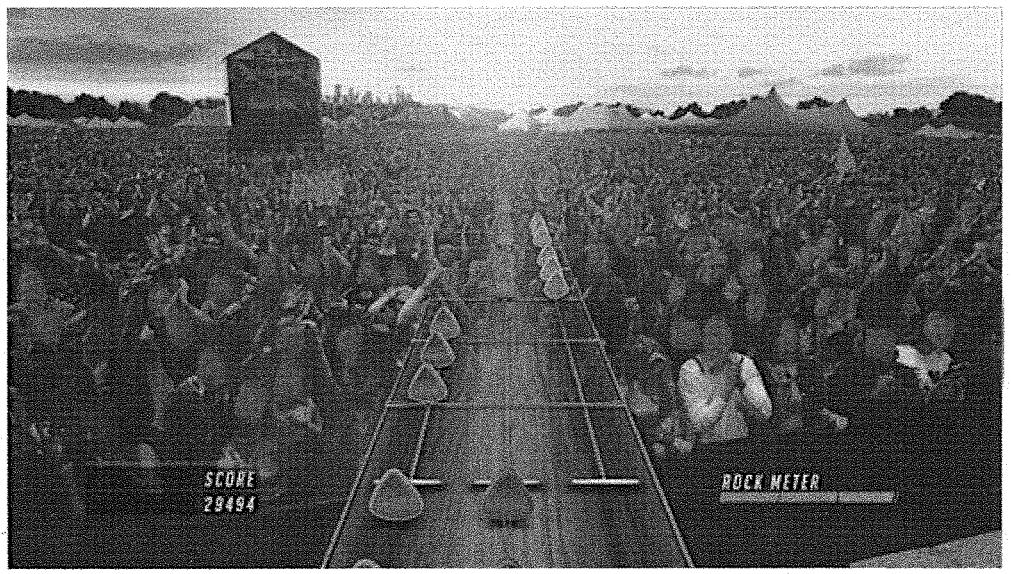

In block 427, the process updates the game scene based on user's performance as determined in block 425. As discussed, the game scene may consist of or comprise recorded video. In such embodiments, the recorded video may be updated in accordance with the process for transitioning between a plurality of recorded video tracks as described in connection with FIG. 3. In some embodiments, the recorded video depicts a crowd, audience, band members, or other aspects of a concert scene. As the user's performance improves, the recorded video of the crowd, audience, band members, or other aspects may transition to a recorded video track that reflects the user's improved performance (e.g., one in which the audience is more excited and enthusiastic). Conversely, as the user's performance worsens the recorded video of the crowd, audience, band members, or other aspects may transition to a recorded video track that reflects the degraded performance (e.g., one in which the audience is apathetic or even hostile). FIGS. 6A and 6B depict game scenes in which the recorded video track of the band members and crowd, respectively, reflect the user's poor performance. FIGS. 7A and 7B depict game scenes in which the recorded video track of the band members and crowd, respectively, reflect the user's positive performance.

In block 429, the process checks if the game has finished. Finishing may be based, for example, on the elapsed time since the game started, on the completion of the song being performed, or a user input. If the game has finished, the process returns; otherwise, the process returns to block 421. The process may save information about the game, for example, the user's score and performance level, before returning.

Figure 5:
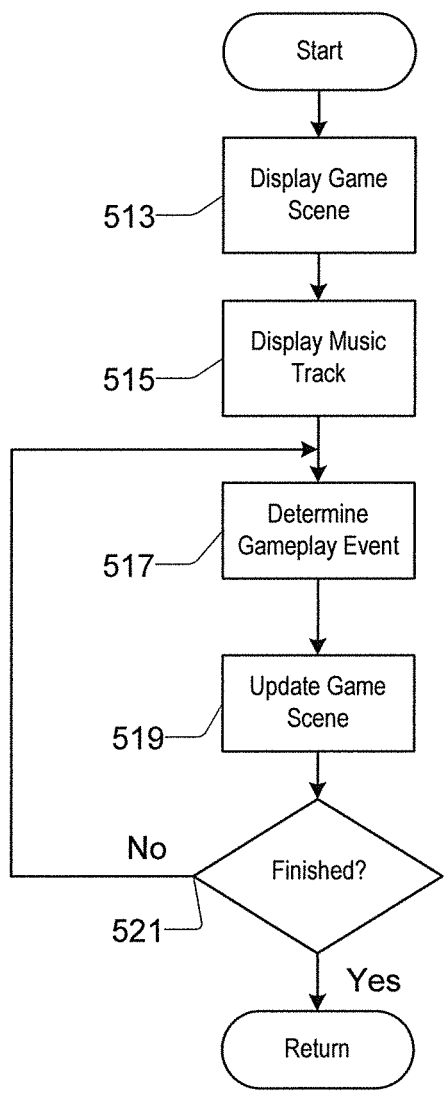
FIG. 5 is flowchart of another process for a video game in accordance with aspects of the invention.

FIG. 5 is a flowchart of a process for updating a game scene in response to gameplay events in accordance with aspects of the invention. In some embodiments, the process is performed by the video game console of FIGS. 1A and 1B, or a processor of the video game console, for example, as discussed with respect to FIG. 2. Program instructions for the process may be stored on an optical disc or another computer-readable medium. Although the process is described in the context of a music-based video game, one of ordinary skill will recognize that the teachings of the process may be applied to other video game genres in which recorded video may be used to increase realism and immersion, including for example, sports games, first-person shooters, action adventure games, real-time strategy games, etc.

In block 513, the process displays a game scene in accordance with the game scenes discussed in connection with FIGS. 3 and 4, above.

In block 515, the process displays a music track in accordance with the music track discussed in connection with block 415 of FIG. 4, above.

In block 517, the process determines whether a particular gameplay event has occurred. Gameplay events may be, for example, the user performing a predefined input, motion, or pose. Other examples of gameplay events may be, for example, reaching a particular timestamp in a song or the joining of one or more additional users into the game. Other examples of gameplay events may be, for example, the user achieving a particular milestone or completing a particular challenge.

In block 519, the process updates the game scene based on the determined gameplay event. Where the game scene comprises recorded video portions, the recorded video may be updated in accordance with the process for transitioning between a plurality of recorded video tracks as described in connection with FIG. 3. In some embodiments, the recorded video depicts a crowd, audience, or other aspects of a concert scene. When a particular gameplay event is detected, such as reaching the chorus of a song, the recorded video of the crowd may transition to a different target recorded video track, for example, one in which the crowd sings along to the chorus of the song. Another example might be transitioning the recorded video of the crowd into one that depicts an excited crowd when one or more users join in mid-game.

In block 521, the process checks if the game has finished. Finishing may be based, for example, on the elapsed time since the game started, on the completion of the song being performed, or a user input. If the game has finished, the process returns; otherwise, the process returns to block 517. The process may save information about the game, for example, the user's score and performance level, before returning.

The teachings of the invention may be applied to a variety of videogame genres to offer more realistic and immersive gameplay. For example, in a music or rhythm based video game, depicting the audience, band members, and other aspects of the scene using recorded video tracks that dynamically transition based on user performance or other gameplay events helps give the game player the sense that he is performing in front of a live audience and scene. Similarly, in a sports video game, depicting team members, opponents, coaches, spectators, and other aspects of the scene using recorded video helps give the game player a sense that he is actually competing in a live sporting event. One of ordinary skill would recognize that the teachings may be applied to any number of videogame genres to increase realism.

Although the invention has been described with respect to certain specific embodiments, it should be recognized that the invention comprises the novel and unobvious claims supported by this disclosure, along with their insubstantial variations.

The invention claimed is:

1. A method for providing video game play for a video game, comprising:
   recording a first video track and a second video track, at different times, during a course of a song, the first recorded video track and the second recorded video track each providing views from the same common camera positions and angles that commonly change in time during the course of the song;
   displaying a game scene during play of a video game, the game scene including recorded video portions from the first recorded video track and graphically rendered portions;
   determining that user performance has worsened;
   in response to determining that user performance has worsened, transitioning display of the game scene to include recorded video portions from the second recorded video track instead of the first recorded video track; and
   wherein the first recorded video track includes a crowd showing a first state and the second recorded video track includes the crowd showing a second state, the first state being different than the second state, and at least some members of the crowd have positions with respect to each other that are the same for both the first recorded video track and the second recorded video track;
   wherein the transitioning comprises blurring display of one of the first recorded video track or the second recorded video track for a period of time.

2. The method of claim 1, wherein the video game is a music-based video game.

3. The method of claim 1, wherein the transitioning comprises displaying a lens flare effect between the first recorded video track and the second recorded video track.

4. The method of claim 1, wherein the transitioning further comprises morphing the first recorded video track into the second recorded video track.

5. The method of claim 1, wherein the first recorded video track includes members of a band showing a first state and the second recorded video track includes the members of the band showing a second state.

6. The method of claim 1, wherein the changes in time are over a course of a song.

7. The method of claim 1, wherein the transitioning further comprises blurring display of the other of the first recorded video track or the second recorded video track for a period of time.

8. The method of claim 1, further comprising: based on the determined user performance, transitioning display of the game scene to include recorded video portions of a third recorded video track.

9. A method of conducting a music-based video game, comprising:
- recording a first video track and a second video track, at different times, wherein the first recorded video track and the second recorded video track each providing views from the same common camera positions and angles that commonly change in time;
- displaying a game scene during play of a video game, the game scene including recorded video portions and graphically rendered portions;
- the recorded video portions comprising a first recorded video track;
- determining that a predetermined game play event has occurred; and
- in response to determining that the predetermined game play event has occurred, transitioning the game scene from the first recorded video track to the second recorded video track.

10. The method of claim 9, wherein the transitioning comprises blurring display of one of the first recorded video track or the second recorded video track for a period of time.

11. A system useful in providing for videogame play, comprising:
- a processor configured by program instructions to provide for gameplay of a music-based videogame;
- memory storing first and second recorded video tracks;
- a display for displaying video in accordance with commands of the processor;
- wherein the program instructions include program instructions for:
    - commanding display of a game scene during videogame play, the game scene including recorded video portions and graphically rendered portions, the recorded video portions comprising the first recorded video track;
    - determining user performance; and,
    - based on the determined user performance, commanding transition of the first recorded video track to the second recorded video track;
- wherein the first recorded video track and the second recorded video track each provide views from common camera positions and angles which commonly change over time.

\* \* \* \* \*